(12) United States Patent
Motegi et al.

(10) Patent No.: US 11,858,510 B2
(45) Date of Patent: Jan. 2, 2024

(54) VEHICLE DRIVE ASSIST APPARATUS

(71) Applicant: SUBARU CORPORATION, Tokyo (JP)

(72) Inventors: Keisuke Motegi, Tokyo (JP); Masatoshi Minakawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 158 days.

(21) Appl. No.: 17/493,648

(22) Filed: Oct. 4, 2021

(65) Prior Publication Data

US 2022/0105931 A1 Apr. 7, 2022

(30) Foreign Application Priority Data

Oct. 2, 2020 (JP) .................. 2020-168081

(51) Int. Cl.
*B60W 30/12* (2020.01)
*B62D 15/02* (2006.01)
*G06V 20/56* (2022.01)

(52) U.S. Cl.
CPC ........... *B60W 30/12* (2013.01); *B62D 15/021* (2013.01); *G06V 20/56* (2022.01); *B60W 2420/42* (2013.01); *B60W 2552/53* (2020.02); *B60W 2554/4045* (2020.02)

(58) Field of Classification Search
CPC ............. B60W 30/12; B60W 2420/42; B60W 2552/53; B60W 2554/4045; B62D 15/021; B62D 15/025; G06V 20/56; G06V 20/588
See application file for complete search history.

(56) References Cited

U.S. PATENT DOCUMENTS

| 9,120,486 | B1* | 9/2015 | Mallinger | B60W 30/12 |
| 2003/0072471 | A1* | 4/2003 | Otsuka | G06V 10/44 |
| | | | | 382/103 |
| 2019/0130736 | A1* | 5/2019 | Silver | G05D 1/0246 |
| 2020/0255008 | A1* | 8/2020 | Kim | B62D 1/28 |
| 2023/0079860 | A1* | 3/2023 | Kuehner | B60W 60/001 |
| | | | | 701/41 |
| 2023/0129175 | A1* | 4/2023 | Shen | G06V 10/774 |
| | | | | 382/104 |

FOREIGN PATENT DOCUMENTS

JP 2019-79470 A 5/2019

* cited by examiner

*Primary Examiner* — Thomas Ingram
(74) *Attorney, Agent, or Firm* — TROUTMAN PEPPER HAMILTON SANDERS LLP

(57) ABSTRACT

A vehicle drive assist apparatus includes an external environment recognizer, a traveling environment recognizer, and a processor. The traveling environment recognizer recognizes travel lane sides of dividing lines defining a travel lane as two approximate lines each in a linear form based on the image data on a traveling environment acquired by the external environment recognizer. When a static three-dimensional object has been continuously detected on or near one of dividing lines based on the image data, the processor sets a virtual approximate line by correcting the lateral position of the approximate line of the one of the dividing lines in a direction apart from the static three-dimensional object toward the middle of the travel lane by a predetermined correction amount, and sets a target travel course in the middle between the virtual approximate line and the approximate line of the other of the dividing lines.

4 Claims, 15 Drawing Sheets

VEHICLE DRIVE ASSIST APPARATUS

CROSS-REFERENCE TO RELATED APPLICATION

The present application claims priority from Japanese Patent Application No. 2020-168081 filed on Oct. 2, 2020, the entire contents of which are hereby incorporated by reference.

BACKGROUND

The technology relates to a vehicle drive assist apparatus that recognizes lane dividing lines on the basis of an image captured by an in-vehicle camera and performs traveling control on the basis of the lane dividing lines recognized.

Recent years has seen development in various drive assist apparatuses that assist driver's driving operations. The drive assist apparatus generally implements touring assist functions including a lane-keep assist function by recognizing lane dividing lines on the basis of an image of the environment in front of an own vehicle and estimating the travel lane on which the own vehicle is traveling on the basis of the lane dividing lines.

A technique for recognizing lane dividing lines is disclosed in Japanese Unexamined Patent Application Publication (JP-A) No. 2019-79470, for example. JP-A No. 2019-79470 discloses a vehicle lane dividing line recognizer that appropriately recognizes lane dividing lines by removing effects of an image of light incident on to a road surface. The existing vehicle lane dividing line recognizer recognizes a lane dividing line by searching each search line for edge points where the luminance changes to a predetermined luminance, extracting an edge point where the luminance changes from a dark level to a bright level as the start point of the lane dividing line, and extracting an edge point where the luminance changes from a bright level to a dark level as the end point of the lane dividing line.

The vehicle drive assist apparatus performs touring assist functions, such as a lane-keep assist function and an active lane-keep centering function, on the basis of the recognized lane dividing lines defining the travel lane on which an own vehicle is traveling.

SUMMARY

An aspect of the technology provides a vehicle drive assist apparatus including an external environment recognizer, a traveling environment recognizer, and a processor. The external environment recognizer is to be installed on a vehicle and configured to acquire image data on a traveling environment in front of the vehicle. The traveling environment recognizer is configured to recognize sides of dividing lines defining a travel lane as two approximate lines on the basis of the image data on the traveling environment acquired by the external environment recognizer. The sides of the dividing lines are adjacent to the travel lane. The two approximate lines are each in a linear form. The processor is configured to set a target travel course in the middle between the two approximate lines and control a steering mechanism of the vehicle to cause the vehicle to travel along the target travel course. When a static three-dimensional object has been continuously detected on or near one of the dividing lines on the basis of the image data on the traveling environment, the processor is configured to set a virtual approximate line by correcting the lateral position of the approximate line of the one of the dividing lines on which the static three-dimensional object is placed in a direction apart from the static three-dimensional object toward the middle of the travel lane by a predetermined correction amount, and set the target travel course in the middle between the virtual approximate line and the approximate line of the other of the dividing lines.

An aspect of the technology provides a vehicle drive assist apparatus including an external environment recognizer and circuitry. The external environment recognizer is installed on a vehicle and configured to acquire image data on a traveling environment in front of the vehicle. The traveling environment recognizer is configured to recognize sides of dividing lines defining a travel lane as two approximate lines each in a linear form on the basis of the image data on the traveling environment acquired by the external environment recognizer. The sides of the dividing lines are adjacent to the travel lane. The two approximate lines are each in a linear form. The circuitry is configured to set a target travel course in the middle between the two approximate lines and control a steering mechanism of the vehicle to cause the vehicle to travel along the target travel course. When a static three-dimensional object has been detected on or near one of the dividing lines on the basis of the image data on the traveling environment, the circuitry is configured to set a virtual approximate line by correcting the lateral position of the approximate line of the one of the dividing lines on which the static three-dimensional object is placed in a direction apart from the static three-dimensional object toward the middle of the travel lane by a predetermined correction amount, and set the target travel course in the middle between the virtual approximate line and the approximate line of the other of the dividing lines.

BRIEF DESCRIPTION OF THE DRAWINGS

The accompanying drawings are included to provide a further understanding of the technology and are incorporated in and constitute a part of this specification. The drawings illustrate example embodiments and, together with the specification, serve to explain the principles of the technology.

DETAILED DESCRIPTION

In a case where a touring assist function is implemented by an existing technique while a vehicle is passing through a construction area in which traffic cones or construction signboards are placed on a lane dividing line or while the vehicle is traveling on a lane separated from an oncoming lane by a lane dividing line on which poles are placed rather than by a center divider, the touring assist function causes the vehicle to travel along a travel course determined on the basis of the lane dividing line. This can cause a driver to feel scared when the vehicle passes by the poles, traffic cones, and construction signboards.

It is desirable to provide a vehicle drive assist apparatus that helps prevent a driver from feeling scared while the driver is driving the vehicle.

Some example embodiments of the technology will now be described in detail with reference to the accompanying drawings. Note that the following description is directed to illustrative examples of the technology and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments that are not recited in a most-generic independent claim of the technology are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
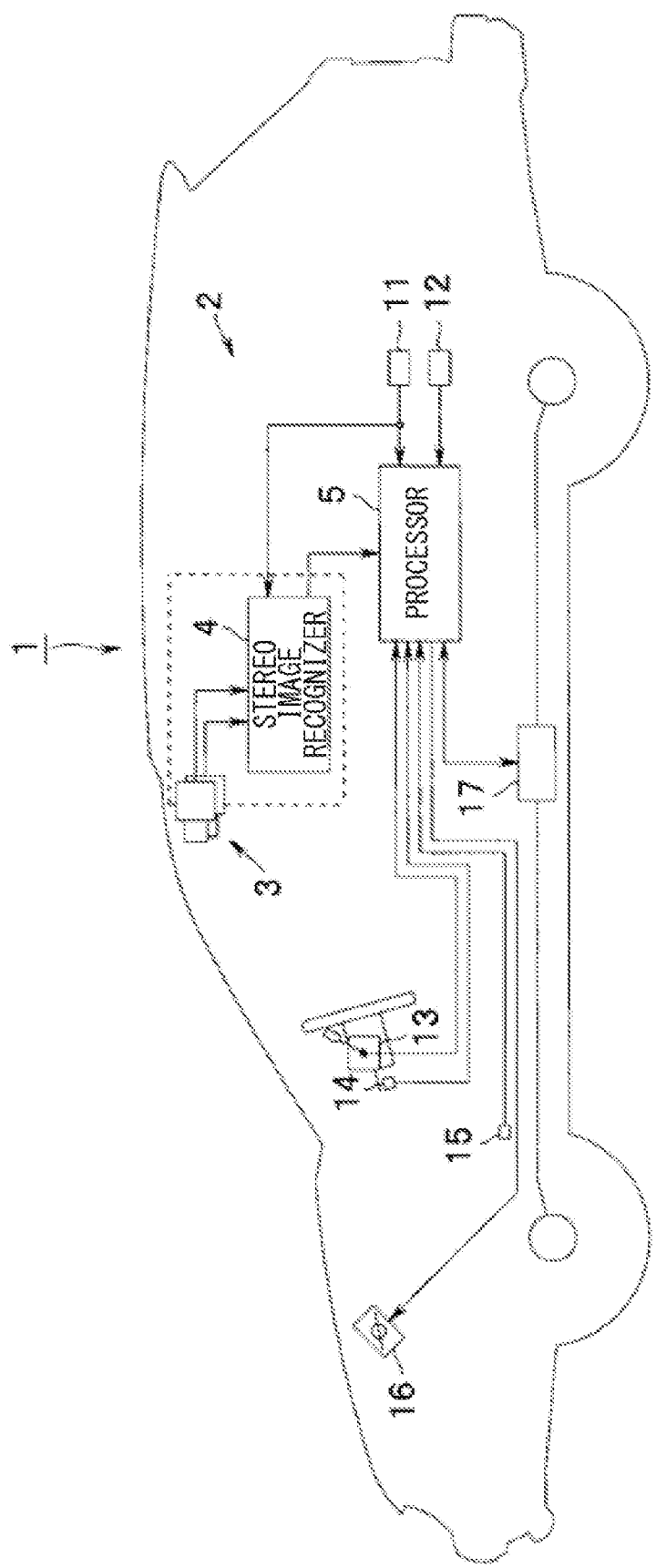
FIG. 1 is a schematic diagram illustrating an exemplary configuration of a vehicle drive assist apparatus according to one example embodiment of the technology.

With reference to FIG. 1, an own vehicle 1 may include a drive assist apparatus 2. The own vehicle 1 may be an automobile, for example. The drive assist apparatus 2 includes a stereo camera 3, a stereo image recognizer 4, and a processor 5, for example. In one embodiment, the stereo camera 3 may serve as an "external environment recognizer". In one embodiment, the stereo image recognizer 4 may serve as a "traveling environment recognizer". In one embodiment, the processor 5 may serve as a "processor".

The own vehicle 1 may include a vehicle speed sensor 11 that detects an own vehicle speed, a yaw rate sensor 12 that detects a yaw rate, a main switch 13 that performs on-off operations of drive assist control functions, a steering angle sensor 14 that is disposed facing a steering shaft coupled to a steering wheel to detect a steering angle, and an accelerator position sensor 15 that detects the stepping quantity of an accelerator pedal (i.e., an accelerator position) inputted by a driver.

The stereo camera 3 may include a pair of cameras (e.g., a right camera and a left camera) including a stereo optical system, such as a solid state imaging device. Examples of the solid state imaging device may include a charge coupled device (CCD) and a complementary metal oxide semiconductor (CMOS). The left and right cameras may be installed on a front portion of the vehicle compartment ceiling at a predetermined distance. These cameras may capture images of a target object present outside the own vehicle 1 from different point of views to generate stereo images, and output the data on the stereo images to the stereo image recognizer 4.

Hereinafter, one of the stereo images (e.g., a right image) may be referred to as a reference image, and the other of the stereo images (e.g., a left image) may be referred to as a comparative image.

The stereo image recognizer 4 may divide the reference image into small sections each including 4×4 pixels, and detect respective small sections of the comparative image by comparing the luminance or the color pattern of each small section of the reference image with the luminance or the color pattern of each small section of the comparative image. In this way, the stereo image recognizer 4 may obtain a distance distribution over the entire reference image.

Further, the stereo image recognizer 4 may detect a luminance difference between each adjacent pixels in the reference image, and extract pixels having a luminance difference greater than a threshold as an edge. The stereo image recognizer 4 may assign distance data to the extracted pixels (edge). In this way, the stereo image recognizer 4 may generate a distance image in which the edges each including distance data are distributed.

Figure 2:
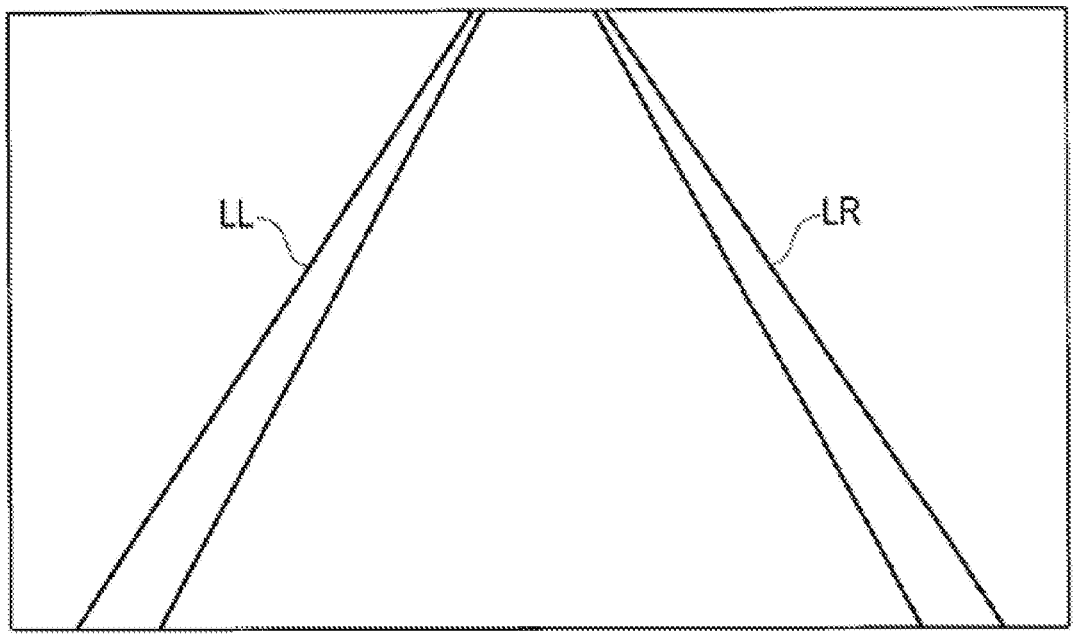
FIG. 2 is an explanatory diagram illustrating an exemplary image of an external environment.

On the basis of the generated distance image, the stereo image recognizer 4 may recognize lane dividing lines LL and LR (see FIG. 2), road edges, sidewalls, and three-dimensional (3D) objects that are present in front of the own vehicle 1. The stereo image recognizer 4 may assign different IDs to the recognized data items and monitor these data items in sequential frames on an ID basis.

For example, the stereo image recognizer 4 may store the data on road edges, sidewalls, and static 3D objects recognized from the three-dimensional (3D) image data obtained by the stereo camera 3 into a later-described two-dimensional (2D) grid map constructed in a predetermined region of an own-vehicle coordinate system. Note that the grid map may be constructed in a region having a width of 6 meters along the lateral width of a front portion of the own vehicle 1 and a length of 40 meters from the front of the own vehicle 1, for example.

Herein, the "lane dividing lines LL and LR" (see FIG. 2) may be used as a generic term that includes, for example, a single line or a multiple line extending on a road to define a travel lane on which the own vehicle 1 is traveling (hereinafter referred to as an own-vehicle travel lane). For example, the lane dividing line LL or LR may be a double line that includes a lane dividing line and a line-of-sight guide line lying inside the lane dividing line. These lines may be of any type, such as solid lines or broken lines, and may be of any color such as white or yellow lighter than the color of the road surface or any color deeper than the color of the road surface.

If a double line is actually recognized on the road in the recognition of the lane dividing line LL or Lr according to the example embodiment, the double line may be approximated to a left or right single line in a straight or curved form before being recognized.

Figure 3:
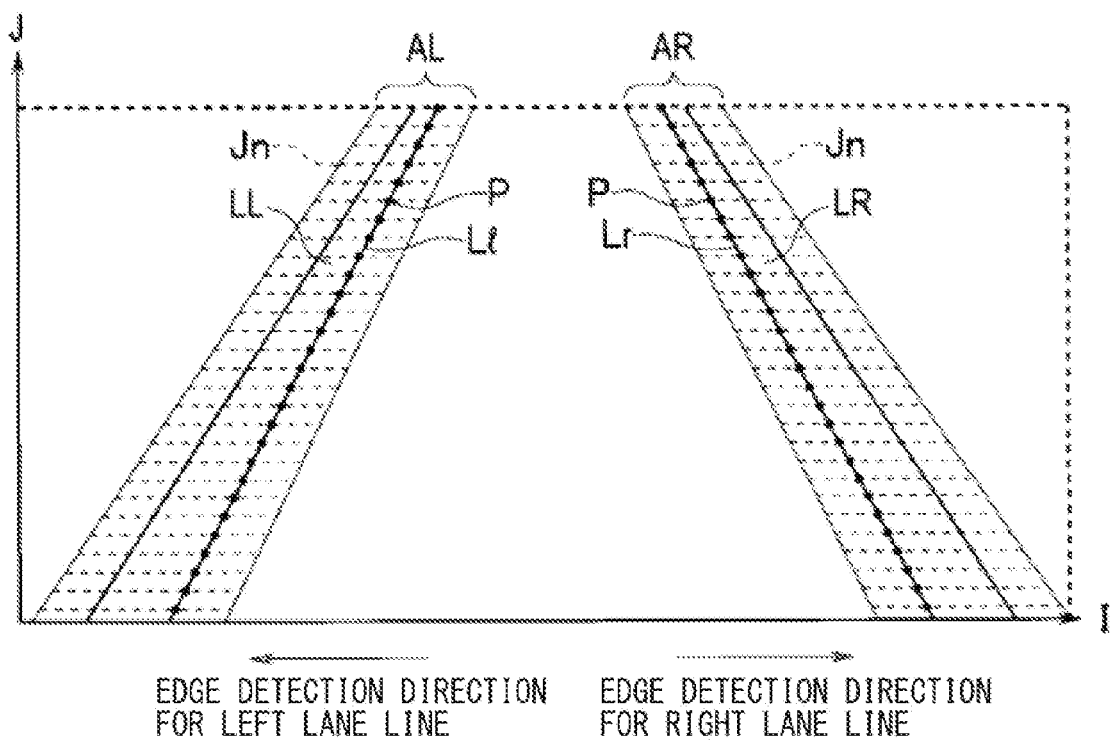
FIG. 3 is an explanatory diagram illustrating a group of lane dividing-line start points detected from an image.

As illustrated in FIG. 3, the stereo image recognizer 4 may recognize the lane dividing line LL or LR by detecting a dividing-line start point P on each search line Jn in a dividing-line search region AL or AR on the basis of a change in luminance on the search line Jn. The dividing-line search regions AL and AR may be set on the image on the basis of the previous processes. The search lines Jn may be set along a horizontal direction (i.e., along the width of the own vehicle 1).

For example, the stereo image recognizer 4 may detect the dividing-line start points P, which are edge points of the lane dividing lines, in the left and right dividing-line search regions AL and AR set in the reference image by detecting a change in luminance value between pixels along each search line Jn from inward to outward in the width direction of the own vehicle 1.

As described above, the stereo image recognizer 4 according to the example embodiment may serve as a front environment recognizer that recognizes the environment in front of the own vehicle 1, a moving 3D object detector, a static 3D object detector, an edge detector (an edge searching unit), an approximate line calculator, a dividing line searching unit, a dividing line calculator, and a detection region setting unit.

The information on the traveling environment in front of the own vehicle 1 recognized by the stereo image recognizer 4 may be sent to the processor 5. Additionally, traveling information on the own vehicle 1, such as the vehicle speed detected by the vehicle speed sensor 11 or the yaw rate detected by the yaw rate sensor 12, and driver's operation input information, such as an operational signal outputted from the main switch 13, the steering angle detected by the steering angle sensor 14, or the accelerator position detected by the accelerator position sensor 15, may be transmitted to the processor 5.

When the driver provides an instruction to execute an adaptive cruise control (ACC) function, which is one of the touring assist functions, by operating the main switch 13, for example, the processor 5 may read the traveling direction of a preceding vehicle recognized by the stereo image recognizer 4 and determine whether a preceding vehicle to follow is traveling on the own-vehicle travel lane.

In a case where no preceding vehicle to follow is detected as a result of the determination, constant-speed traveling control may be executed to keep the vehicle speed of the own vehicle 1 at the set vehicle speed through switching control of a throttle valve 16 (engine output control).

In contrast, in a case where a preceding vehicle to follow is detected and where the preceding vehicle is traveling at the set vehicle speed or less, following traveling control may be executed to cause the own vehicle 1 to travel following the preceding vehicle while the inter-vehicular distance between the own vehicle 1 and the preceding vehicle is converged to a target inter-vehicular distance.

During the following traveling control, the processor 5 may converge the inter-vehicular distance between the own vehicle 1 and the preceding vehicle to the target inter-vehicular distance through the switching control of the throttle valve 16. In a case where the preceding vehicle rapidly decelerates and where it is not determined that the own vehicle 1 is sufficiently decelerated by the switching control of the throttle valve 16 alone, the processor 5 may converge the inter-vehicular distance to the target inter-vehicular distance by pressure control of the liquid outputted from an active booster 17 (automatic brake intervention control) together with the switching control of the throttle valve 16.

When the driver provides an instruction to execute a lane-keep assist function, which is one of the touring assist functions, by operating the main switch 13, for example, the processor 5 may set warning determination lines on the basis of the left and right lane dividing lines defining the own-vehicle travel lane, and estimate an own-vehicle travel course on the basis of the vehicle speed and the yaw rate of the own vehicle 1, for example.

For instance, when determining that the own-vehicle travel course runs across either one of the left and right warning determination lines within a predetermined distance (e.g., 10 to 16 meters) set in front of the own vehicle 1, the processor 5 may determine that the own vehicle 1 is likely to deviate from the current own-vehicle travel lane, and issue a warning against the deviation from the lane.

When the driver provides an instruction to execute an active lane keep centering (ALKC) function, which is one of the touring assist functions, by operating the main switch 13, the processor 5 may set a target travel course in the middle between the left and right lane dividing lines LL and LR defining the own-vehicle travel lane, for example. Thereafter, the processor 5 may perform traveling control along the target travel course by controlling a steering mechanism of the own vehicle 1.

Figure 4:
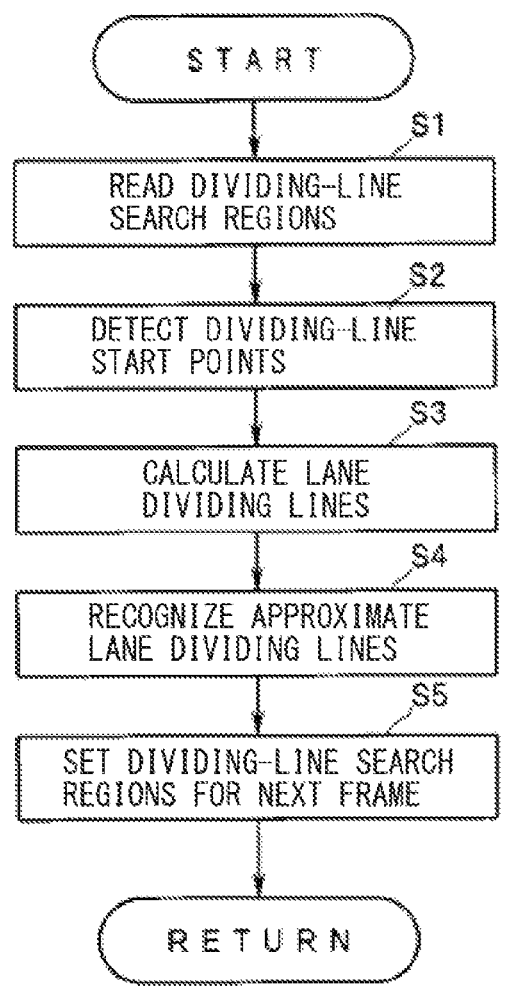
FIG. 4 is a flowchart illustrating exemplary control for detecting lane dividing lines.
Figure 5:
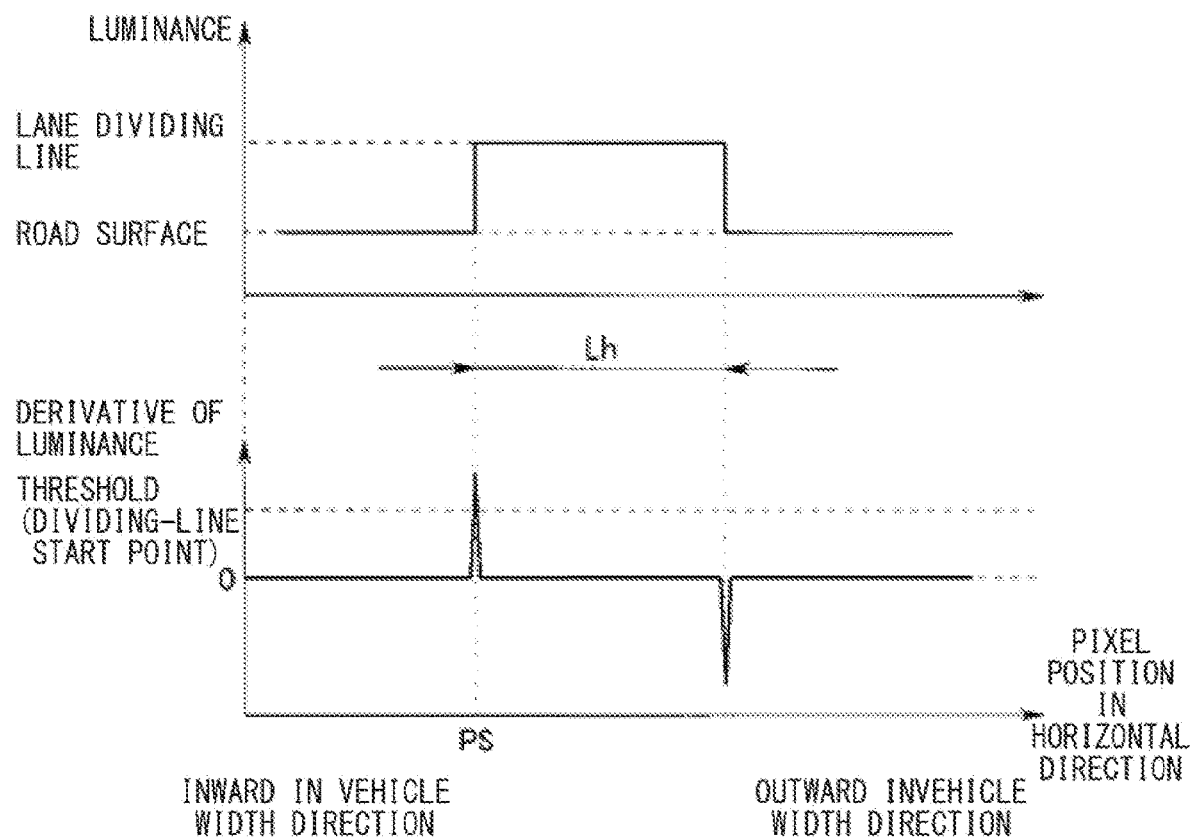
FIG. 5 is a chart illustrating exemplary transitions of the luminance and the derivative of the luminance of a lane dividing line on a search line.

Now, the process performed by the stereo image recognizer 4 to detect and recognize the lane dividing lines LL and LR may be described with reference to the flowchart illustrated in FIG. 4 and the chart illustrated in FIG. 5.

In Step S1, the stereo image recognizer 4 may read the left and right dividing-line search regions AL and AR set in a previous frame. In Step S2, the stereo image recognizer 4 may detect the edges on the search lines Jn on the lane dividing lines LL and LR, for example (see FIG. 3). For instance, the stereo image recognizer 4 may detect the dividing-line start points P in the left and right dividing-line search regions AL and AR from inward to outward in the width direction of the own vehicle 1 with respect to an image center line of the reference image or the own-vehicle traveling direction estimated on the basis of the steering angle, for example.

For more detail, when searching each search line Jn for the edge from inward to outward in the width direction of the own vehicle 1, the stereo image recognizer 4 may detect a potential edge point PS and recognize the potential edge point PS as the dividing-line start point P. As illustrated in FIG. 5, the potential edge point PS may be a first positive edge point where the luminance of a pixel provided relatively outward in the width direction of the own vehicle 1 is greater than the luminance of an adjacent pixel provided relatively inward in the width direction of the own vehicle 1 and where the derivative of the luminance, which indicates the amount of change in the luminance, takes a positive value equal to or greater than a predetermined threshold (luminance threshold).

The stereo image recognizer 4 may recognize the lane dividing lines LL and LR through the steps described above. The lane dividing lines LL and LR may be white lines or yellow lines, for example. When detecting a point where the derivative of the luminance is less than the predetermined threshold, the stereo image recognizer 4 may remove the point from the candidate points to be recognized as the potential edge point PS and remove the point from the candidate points to be recognized as the dividing-line start point P of the lane dividing line LL or LR.

The stereo image recognizer 4 may determine that the lane dividing line LL or LR has not been recognized in a case where the distance Lh between the potential edge point PS, which is the edge start point where the derivative of the luminance takes a positive value, and the edge end point where the derivative of the luminance takes a negative value is equal or less than a predetermined distance (a predetermined line-width threshold). The predetermined distance may be 7 centimeters, for example.

Thereafter, the stereo image recognizer 4 may combine the potential edge points PS or the dividing-line start points P into a group, and calculate the lane dividing line on the basis of the selected point group (Step S3). For example, the stereo image recognizer 4 may perform Hough transformation of the selected point group to calculate the lane dividing line LL or LR in Step S3, and recognize the lane dividing line LL or LR as an approximate line Ll or Lr in a linear form (Step S4).

On the basis of the calculated lane dividing lines LL and LR (approximate lines Ll and Lr), the stereo image recognizer 4 may set the dividing-line search regions AL and AR used in the next frame (Step S5), and detect the lane dividing lines LL and LR as described above.

Figure 6:
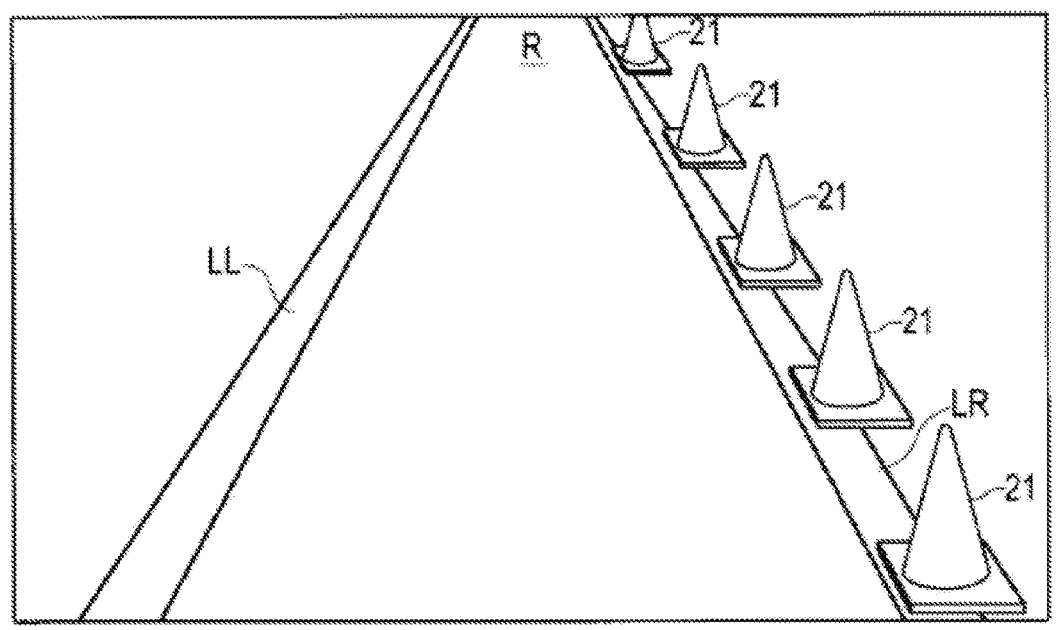
FIG. 6 is an explanatory diagram schematically illustrating an exemplary external environment in which traffic cones are placed on a right lane dividing line.
Figure 7:
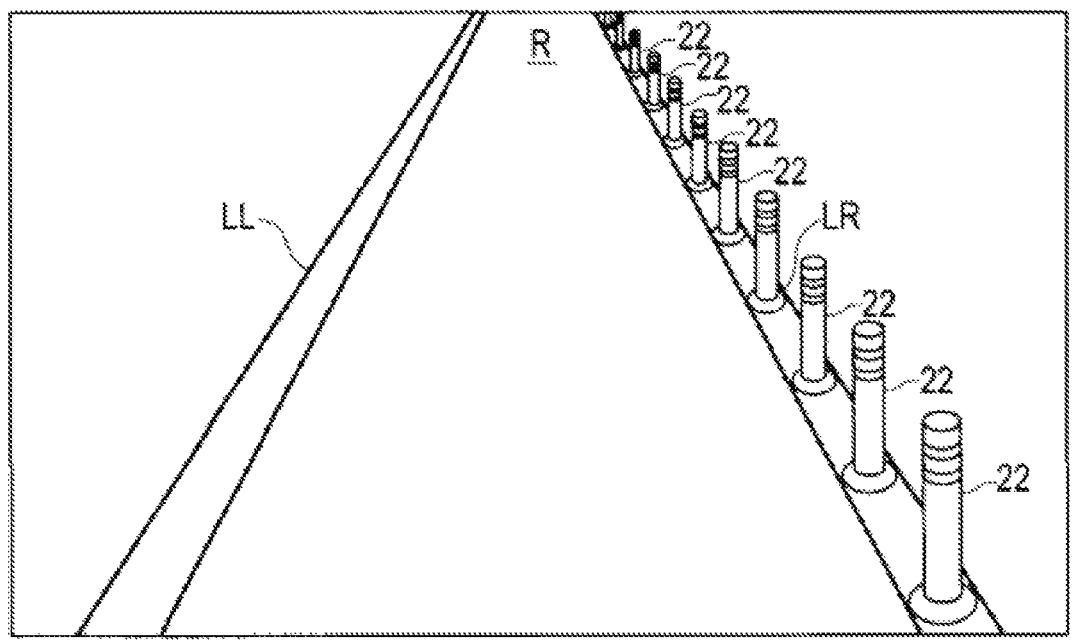
FIG. 7 is an explanatory diagram schematically illustrating an exemplary external environment in which poles are placed on the right lane dividing line.
Figure 8:
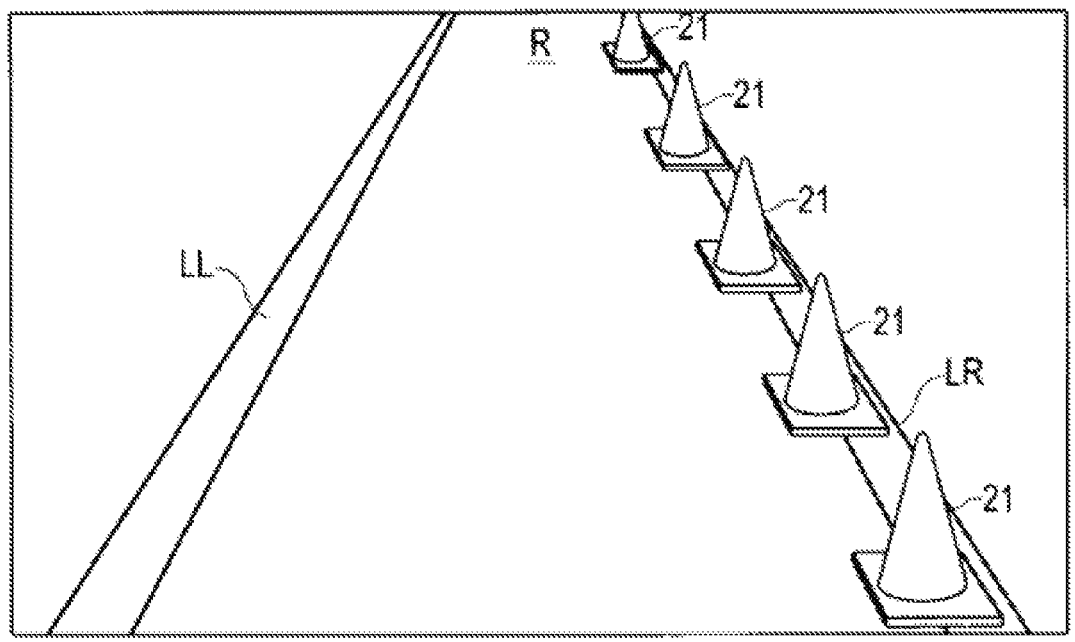
FIG. 8 is an explanatory diagram schematically illustrating an exemplary external environment in which traffic cones are placed protruding from the right lane dividing line.

In a case where an own-vehicle travel lane R on which the own vehicle 1 is traveling is under construction or adjacent to an oncoming lane without a center divider therebetween, the own vehicle 1 may pass through an area in which static (fixed) 3D objects, such as traffic cones 21 or poles 22, are placed on the lane dividing line LL or LR, as illustrated in FIGS. 6 and 7, in some cases. In other cases, the traffic cones 21 may be placed protruding from the lane dividing line LR toward the own-vehicle travel lane R, as illustrated in FIG. 8. Note that FIGS. 6 to 8 illustrate examples in which the static 3D objects are placed on the right lane dividing line LR.

The stereo camera 3 may obtain 3D image data of the traffic cones 21 and the poles 22 and output the image data of these static 3D objects to the stereo image recognizer 4.

Figure 9:
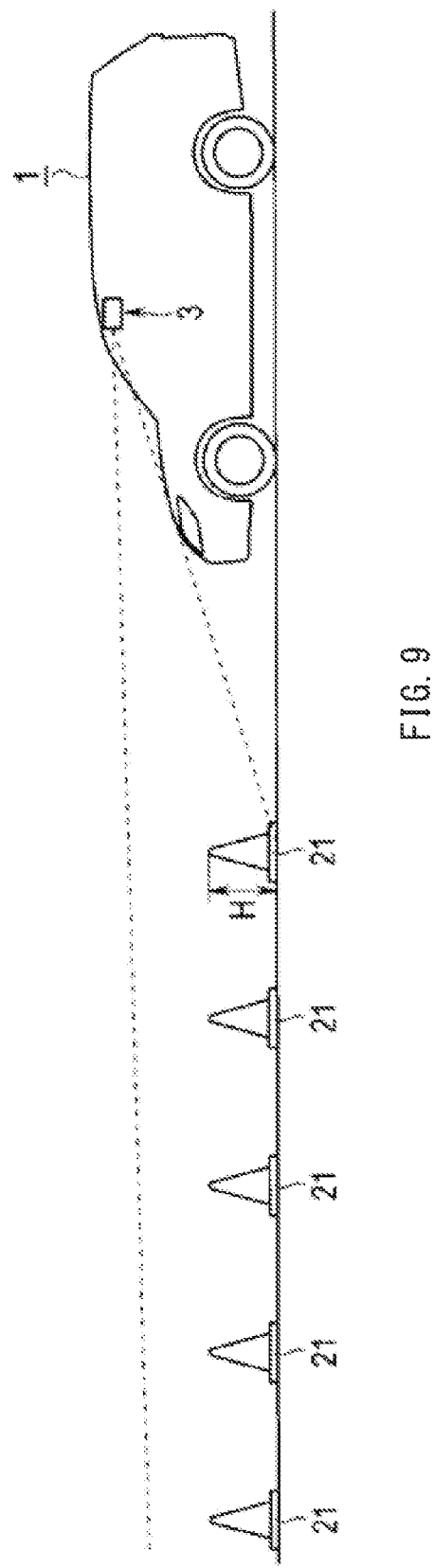
FIG. 9 is an explanatory side-view diagram schematically illustrating exemplary detection of traffic cones placed in front of a vehicle.

As illustrated in FIG. 9, for example, the image data may indicate that the static 3D object (e.g., the traffic cone 21 in this example) recognized as an object has a height of 30 to 40 centimeters.

Figure 10:
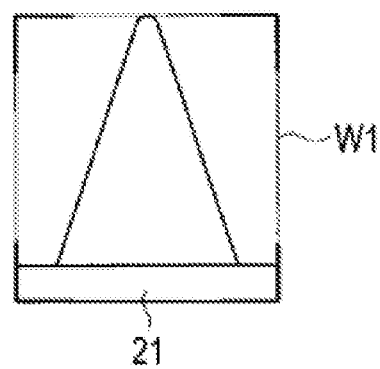
FIG. 10 is an explanatory diagram schematically illustrating exemplary image recognition of a traffic cone.
Figure 11:
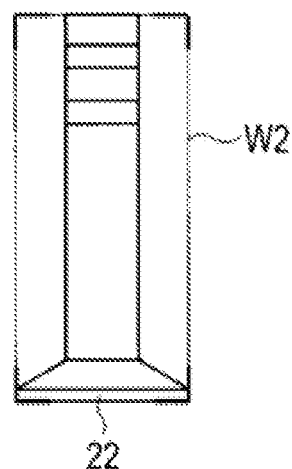
FIG. 11 is an explanatory diagram schematically illustrating exemplary image recognition of a pole.
Figure 12:
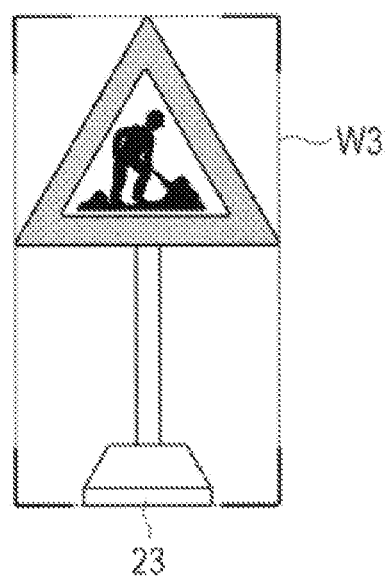
FIG. 12 is an explanatory diagram schematically illustrating exemplary image recognition of a construction signboard.

As illustrated in FIGS. 10 to 12, the stereo image recognizer 4 may generate a detection object model on the basis of the image data. For example, the stereo image recognizer 4 may generate a rectangular frame (also referred to as a bounding box or window) W1 surrounding the shape of the traffic cone 21, a rectangular frame W2 surrounding the shape of the pole 22, or a rectangular frame W3 surrounding the shape of a construction signboard 23.

Thereafter, the stereo image recognizer 4 may detect the position, distance, width, and height (H) of the static 3D object recognized by tagging or classifying the detected object as a static 3D object and labeling or localizing the coordinate data of the static 3D object to the own vehicle 1.

For example, the processor 5 may construct a 2D grid map GM in a predetermined region of an own-vehicle coordinate system extending along the road surface in front of the own vehicle 1 on the basis of the image data received from the stereo image recognizer 4. The predetermined region may have a width of 6 meters in the width direction of the own vehicle 1 and a length of 40 meters from the front of the own vehicle 1, for example.

Figure 13:
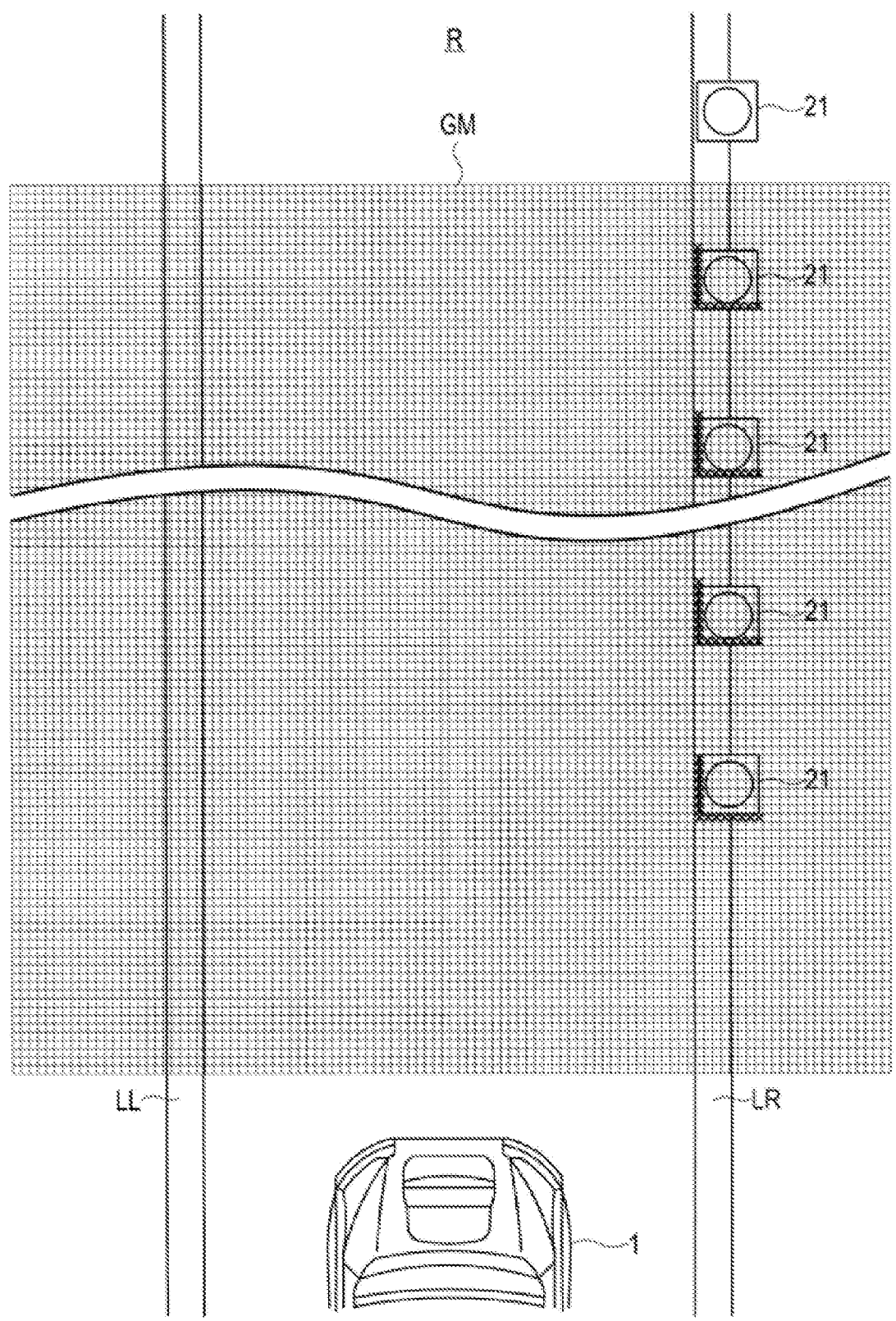
FIG. 13 is an explanatory diagram schematically illustrating an exemplary grid map in which all traffic cones are placed on the lane dividing line without protruding from the lane dividing line.
Figure 14:
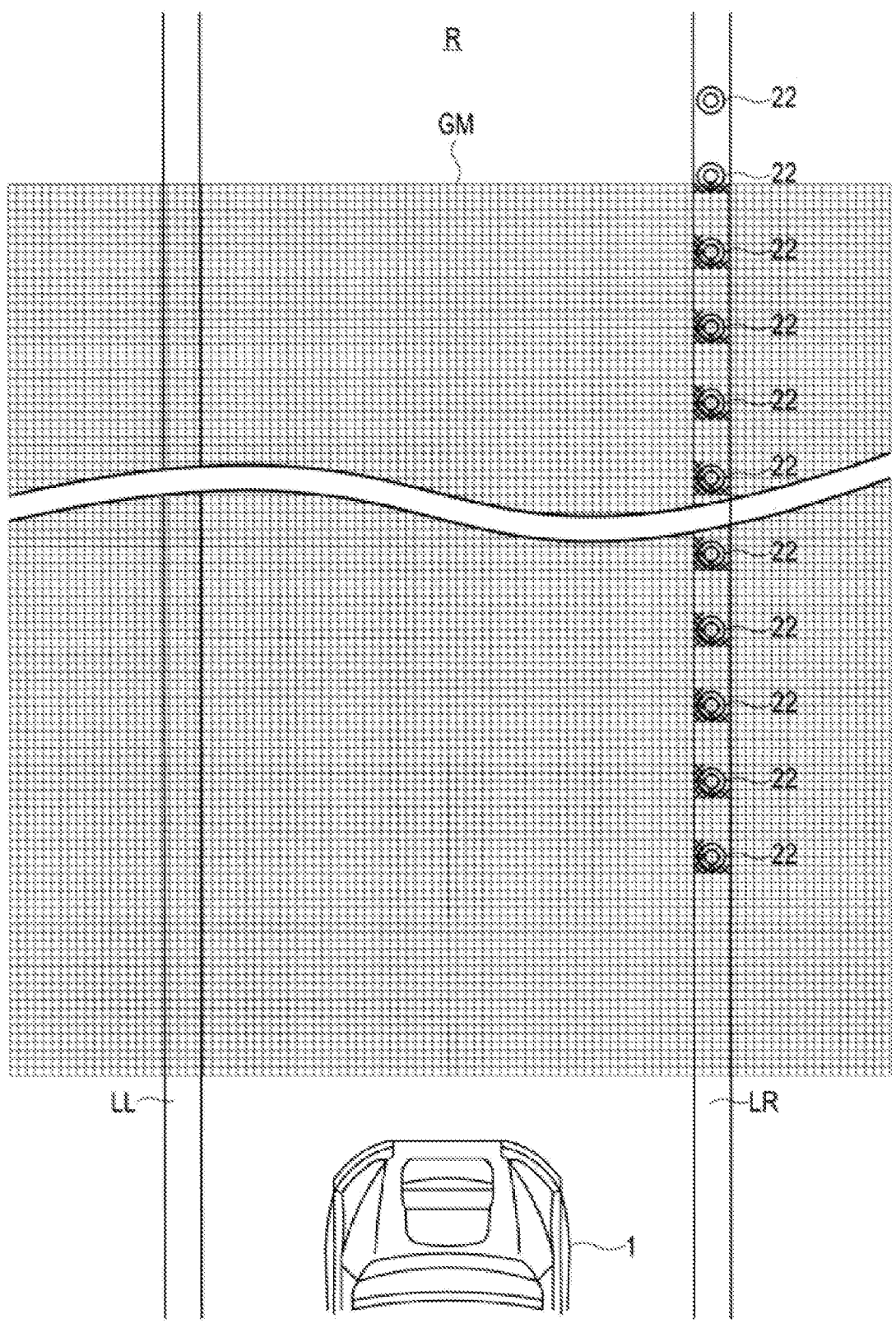
FIG. 14 is an explanatory diagram schematically illustrating an exemplary grid map in which all poles are placed on the lane dividing line without protruding from the lane dividing line.
Figure 15:
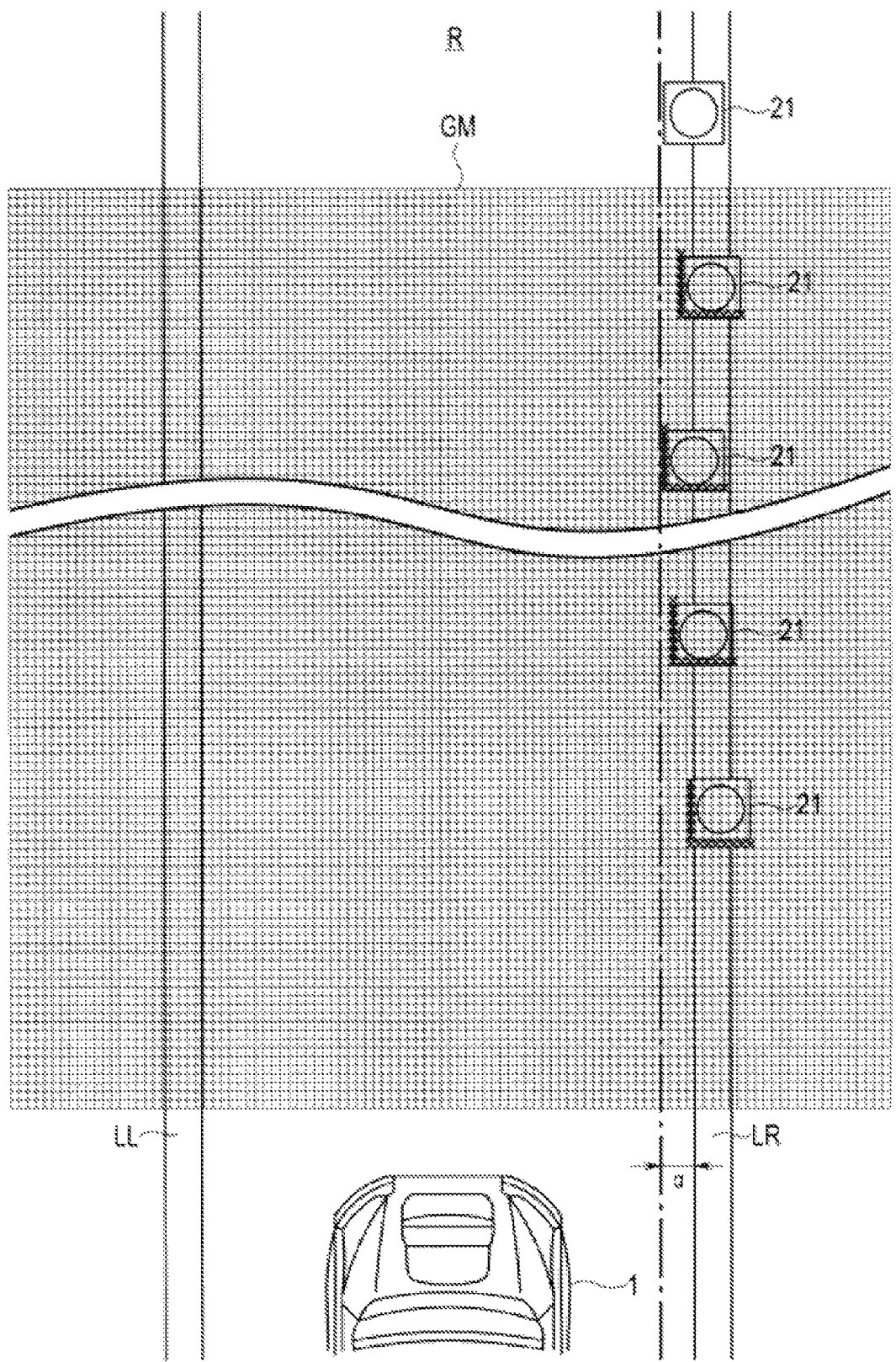
FIG. 15 is an explanatory diagram schematically illustrating an exemplary grid map in which some traffic cones are placed protruding from the lane dividing line.

Thereafter, the processor 5 may store vote grid data of the detected static 3D object into corresponding grid areas of the grid map GM on the basis of the information on the detected static 3D object received from the stereo image recognizer 4 (refer to FIGS. 13 to 15). The grid areas may be divided sections of the grid map GM and each have 10 centimeter sides, for example.

Further, the processor 5 may constantly monitor whether a static 3D object has been continuously detected on the lane dividing line LL or LR in the grid map GM for a predetermined time or longer and whether vote casting of the data on the detected 3D object has been performed for any of the 10-centimeter grid areas of the grid map GM for the predetermined time or longer.

In the example illustrated in FIG. 13, the traffic cones 21 may be placed on the right lane dividing line LR at an interval in the traveling direction of the own vehicle 1. In this example, all the traffic cones 21 are placed on the lane dividing line LR without protruding from the inner side of the lane dividing line LR toward the middle of the own-vehicle travel lane R (i.e., to the own vehicle 1).

In the example illustrated in FIG. 14, the poles 22 may be placed on the right lane dividing line LR at an interval in the traveling direction of the own vehicle 1. All the poles 22 may be placed on the lane dividing line LR without protruding from the inner side of the lane dividing line LR toward the middle of the own-vehicle travel lane R (i.e., to the own vehicle 1).

In the example illustrated in FIG. 15, the traffic cones 21 may be placed on the right lane dividing line LR at an interval in the traveling direction of the own vehicle 1. Some of the traffic cones 21 are placed protruding from the inner side of the lane dividing line LR toward the middle of the own-vehicle travel lane R (i.e., to the own vehicle 1).

Figure 16:
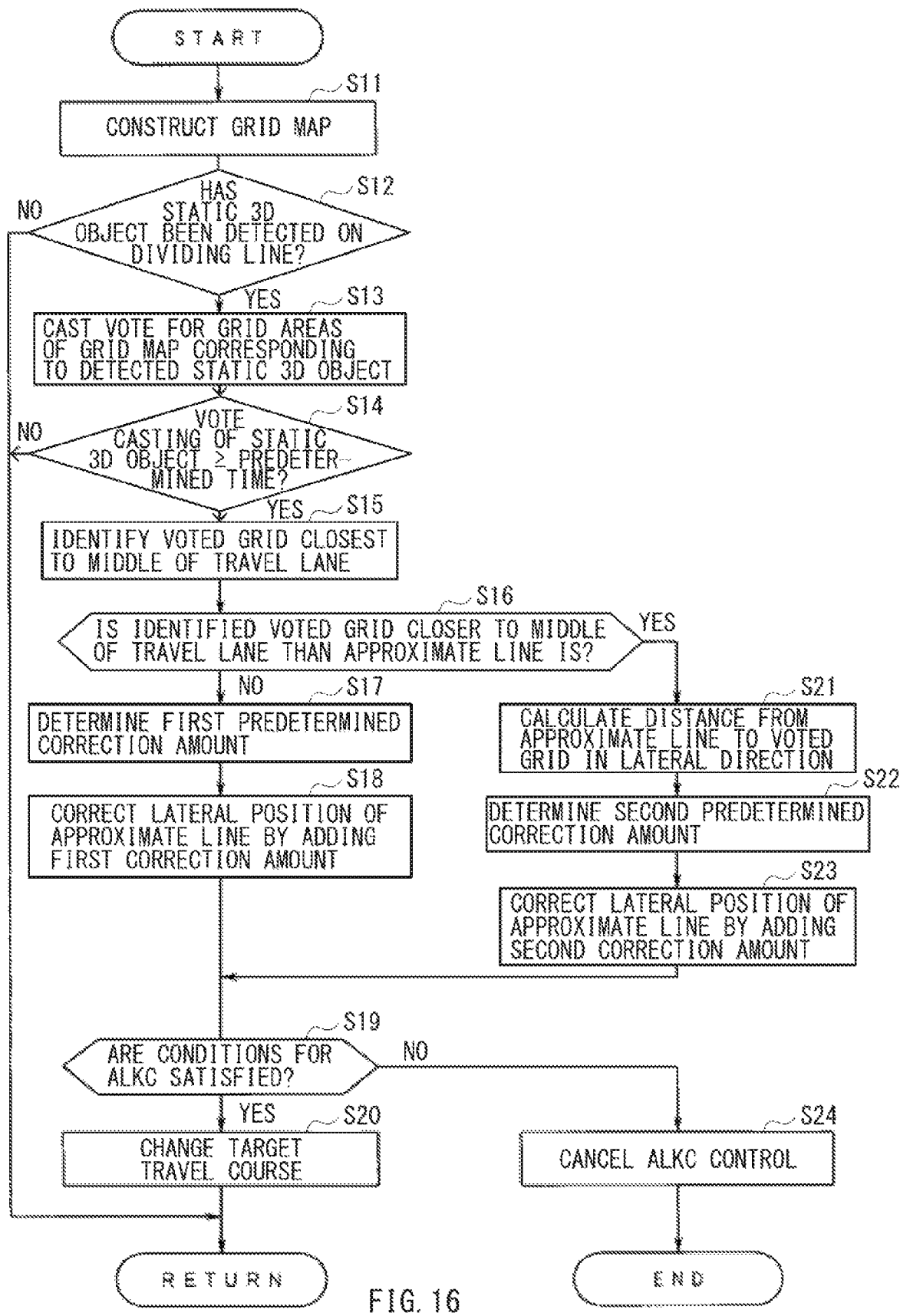
FIG. 16 is a flowchart illustrating exemplary control performed in a case where static three-dimensional objects are detected on the lane dividing line while active lane keep centering control is executed.

With reference to the flowchart illustrated in FIG. 16, exemplary control of the own vehicle 1 will now be described that is performed when the own vehicle 1 travels through an area in which static 3D objects are placed on the lane dividing line LL or LR while the ALKC function is executed by the processor 5 of the drive assist apparatus 2 in the own vehicle 1.

While the ALKC function is executed, the processor 5 may first construct the grid map GM in a predetermined region lying in front of the own vehicle 1 on the basis of the image data received from the stereo image recognizer 4. The predetermined region may have a width of 6 meters in the width direction of the own vehicle 1 and a length of 40 meters from the front of the own vehicle 1, for example (Step S11). Alternatively, the grid map GM may be constructed by the stereo image recognizer 4, and the grid map GM may be read from the stereo image recognizer 4 by the processor 5.

Thereafter, the processor 5 may determine whether static 3D objects, such as the traffic cones 21, the poles 22, or the construction signboards 23, have been detected on the lane dividing line LL or LR on the basis of the data on the static 3D objects detected by the stereo image recognizer 4 (Step S12). If the static objects, such as the traffic cones 21, the poles 22, and the construction signboards 23, have not been detected on the lane dividing line LL or LR (Step S12: NO), the processor 5 may cause the process to exit the routine and return to Step S11.

In contrast, if the static objects, such as the traffic cones 21, the poles 22, and the construction signboards 23, have been detected on the lane dividing line LL or LR (Step S2: YES), the processor 5 may cast a vote for any of the grid areas of the grid map GM corresponding to the detected static object (i.e., may plot a vote grid data in the corresponding grid areas) on the basis of the data on the detected static 3D object (Step S13). For example, as illustrated in FIGS. 13 to 15, the processor 5 may cast a vote for (plot the vote grid data in) the grid areas of the grid map GM corresponding to the position of the static object on the basis of the data on the static 3D objects, such as the traffic cones 21 or the poles 22.

Thereafter, the processor 5 may determine whether the data on the static 3D object detected by the stereo image recognizer 4 has been continuously inputted for a predetermined time or longer, and whether vote casting of the static object has been continuously performed for the grid areas of the grid map GM for the predetermined time or longer (Step S14). If the vote casting of the static object has not been continuously performed for the grid areas of the grid map GM for the predetermined time or longer (Step S14: NO), the processor 5 may cause the process to exit the routine and return to Step S11.

If the vote casting of the static object has been continuously performed for the grid areas of the grid map GM for the predetermined time or longer (Step S14: YES), the processor 5 may identify or select the voted grid closest to the middle of the own-vehicle travel lane R in the width direction of the own vehicle 1, from the voted grids (Step S15). For example, the processor may identify or select the voted grid closest to the own vehicle 1 traveling on the own-vehicle travel lane R when viewed in the width direction of the own vehicle 1.

Thereafter, the processor 5 may determine whether the identified voted grid is positioned closer to the middle of the own-vehicle travel lane R than the approximate line Ll or Lr recognized by the stereo image recognizer 4 is when viewed in the width direction of the own vehicle 1 (i.e., in the lateral direction) (Step S16). That is, the processor 5 may determine whether the identified voted grid protrudes toward the own-vehicle travel lane R from the approximate line Ll or Lr recognized as the lane dividing line LL or LR by the stereo image recognizer 4.

Figure 17:
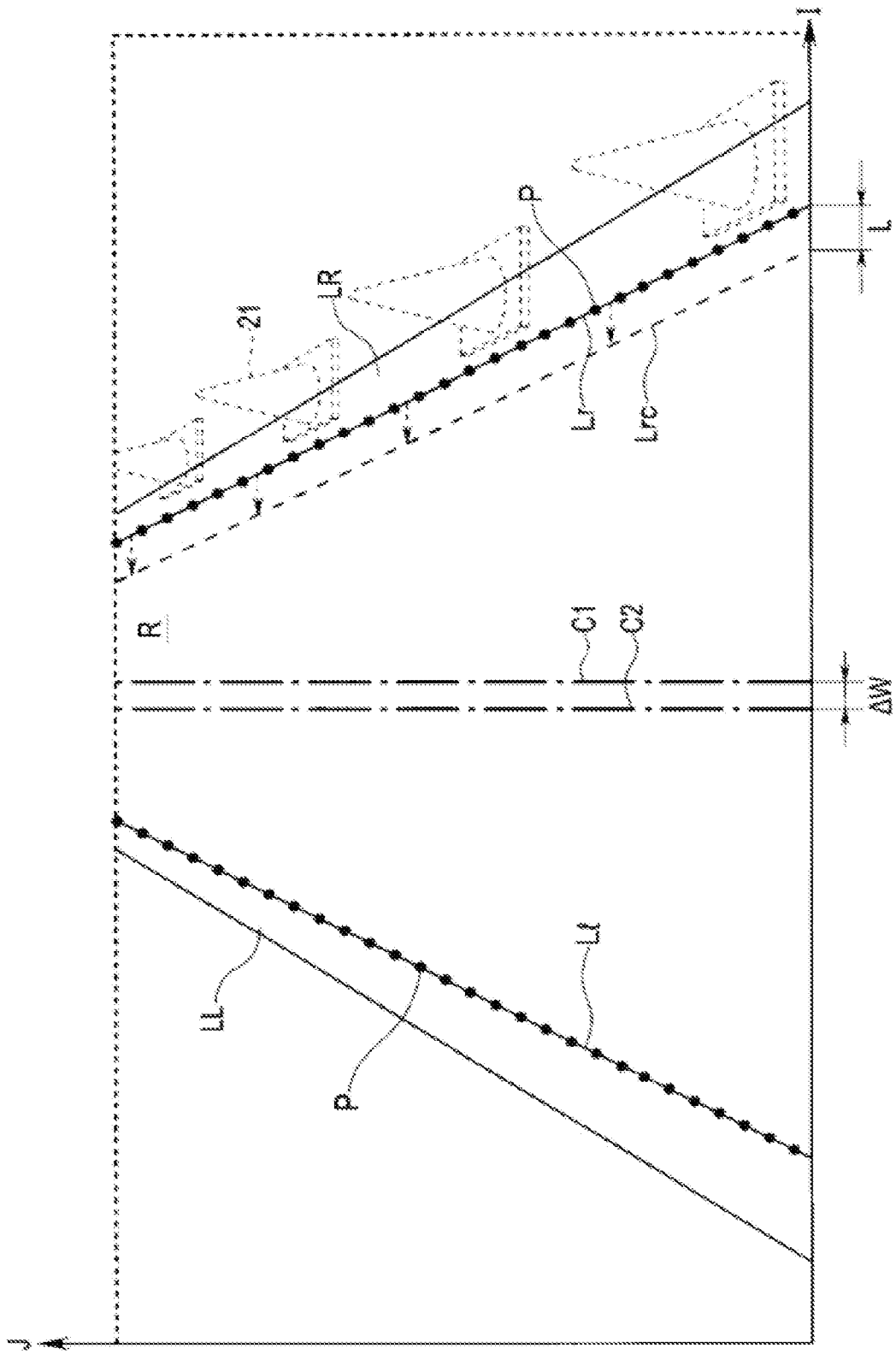
FIG. 17 is an explanatory diagram schematically illustrating an example in which a target travel course is changed by correcting the lateral position of an approximate line of the lane dividing line on which all traffic cones are placed without protruding from the lane dividing line.

If the identified voted grid is not positioned closer to the middle of the own-vehicle travel lane R than the approximate line Ll or Lr is (Step S16: NO), the processor 5 may determine a first predetermined correction amount L on the basis of the vehicle speed of the own vehicle 1 and the distance from the approximate line Ll or Lr to the own vehicle 1 (Step S17). In the example illustrated in FIG. 17, for example, the traffic cones 21 serving as the static 3D objects are placed on the right lane dividing line LR without protruding from the right lane dividing line LR toward the own-vehicle travel lane R. In this example, the processor 5 may determine the first correction amount L by reading the first correction amount L from a correction map set on the basis of the vehicle speed of the own vehicle 1 and the distance from the lane dividing line LL or LR to the own vehicle 1.

In Step S18, the processor 5 may correct the lateral position of the approximate line Ll or Lr by adding the first correction amount L to the approximate line Ll or Lr. For example, the processor 5 may change the approximate line Ll or Lr (e.g., the approximate line Lr of the right lane dividing line LR on which the traffic cones 21 are placed in the example illustrated in FIG. 17) to a virtual approximate line (e.g., a virtual approximate line Lrc in the example illustrated in FIG. 17) by shifting the approximate line Ll or Lr toward the middle of the own-vehicle travel lane R in the lateral direction by the first correction amount L.

In Step S19, the processor 5 may determine whether conditions for ALKC are satisfied. In this step, the processor 5 may determine whether the conditions are satisfied in terms of the vehicle speed of the own vehicle 1, the distance between the approximate line Ll or Lr and the corrected approximate line (e.g., the distance between the approximate line L1 and the virtual approximate line Lrc in the example illustrated in FIG. 17), the distance from a sidewall to the own vehicle 1, and the presence or absence of a road edge or a road shoulder.

If the conditions for ALKC are satisfied (Step S19: YES), the processor 5 may change the target travel course (Step S20) and cause the process to exit the routine and return to Step S11. In the example illustrated in FIG. 18, the processor 5 may change a target travel course C1 set in the middle between the left and right approximate lines Ll and Lr before the correction to a target travel course C2 set in the middle between the left and right approximate lines Ll and Lr (Lrc) after the correction to execute the ALKC control.

Figure 18:
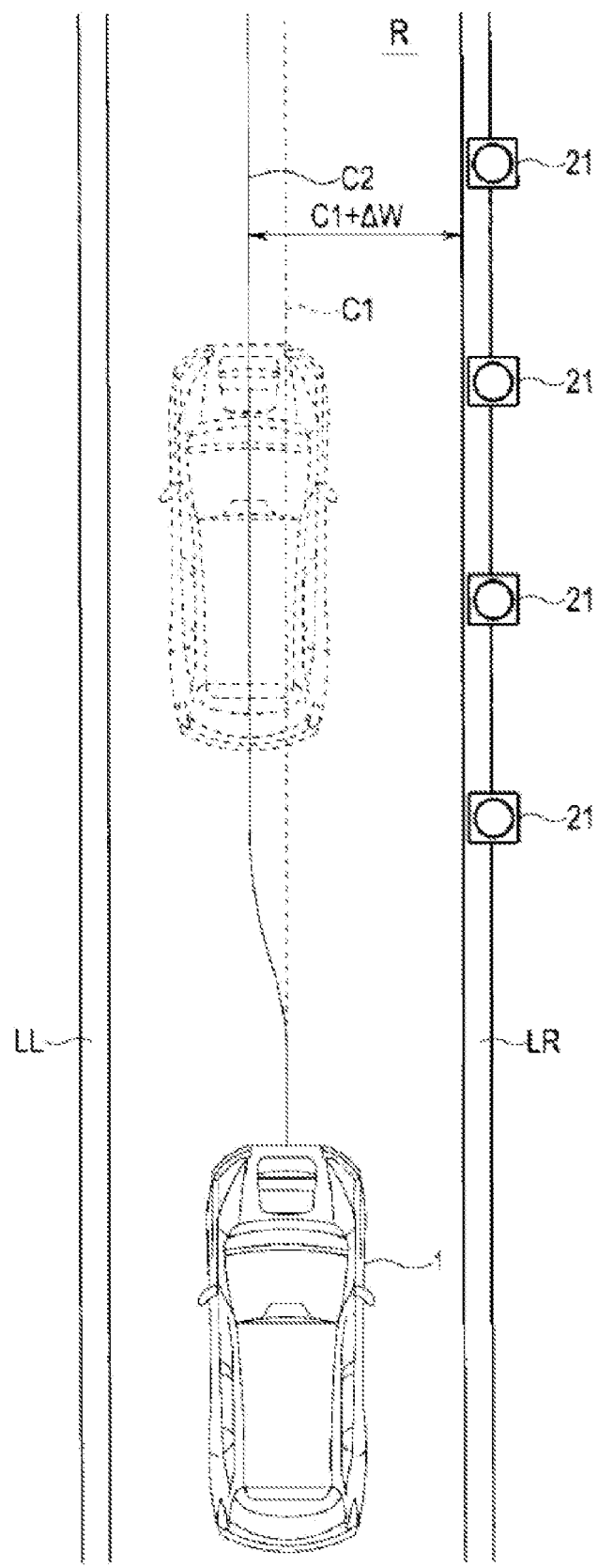
FIG. 18 is an explanatory diagram schematically illustrating an exemplary traveling state of the vehicle observed when the target travel course is changed as in FIG. 17.

When the distance between the left approximate line L1 and the virtual approximate line Lrc is shortened as described above, the target travel course C2 may be newly determined in the middle between the approximate line L1 and the virtual approximate line Lrc by shifting the target travel course C1 originally set in the lateral direction by a predetermined distance ΔW, as illustrated in FIG. 18.

The processor 5 may then perform the ALKC control of the own vehicle 1 along the target travel course C2 obtained through the correction. That is, the processor 5 may change the target travel course C1 set in the middle between the approximate lines Ll and Lr before the correction to the target travel course C2 set in the middle of the approximate lines Ll and Lrc after the correction and execute the ALKC control.

In contrast, if the identified voted grid is positioned closer to the middle of the own-vehicle travel lane R than the approximate line Ll or Lr is when viewed in the width direction of the own vehicle 1 (Step S16: YES), the processor 5 may calculate the distance from the approximate line Ll or Lr on which the static objects are placed to the identified voted grid (Step S21).

Figure 19:
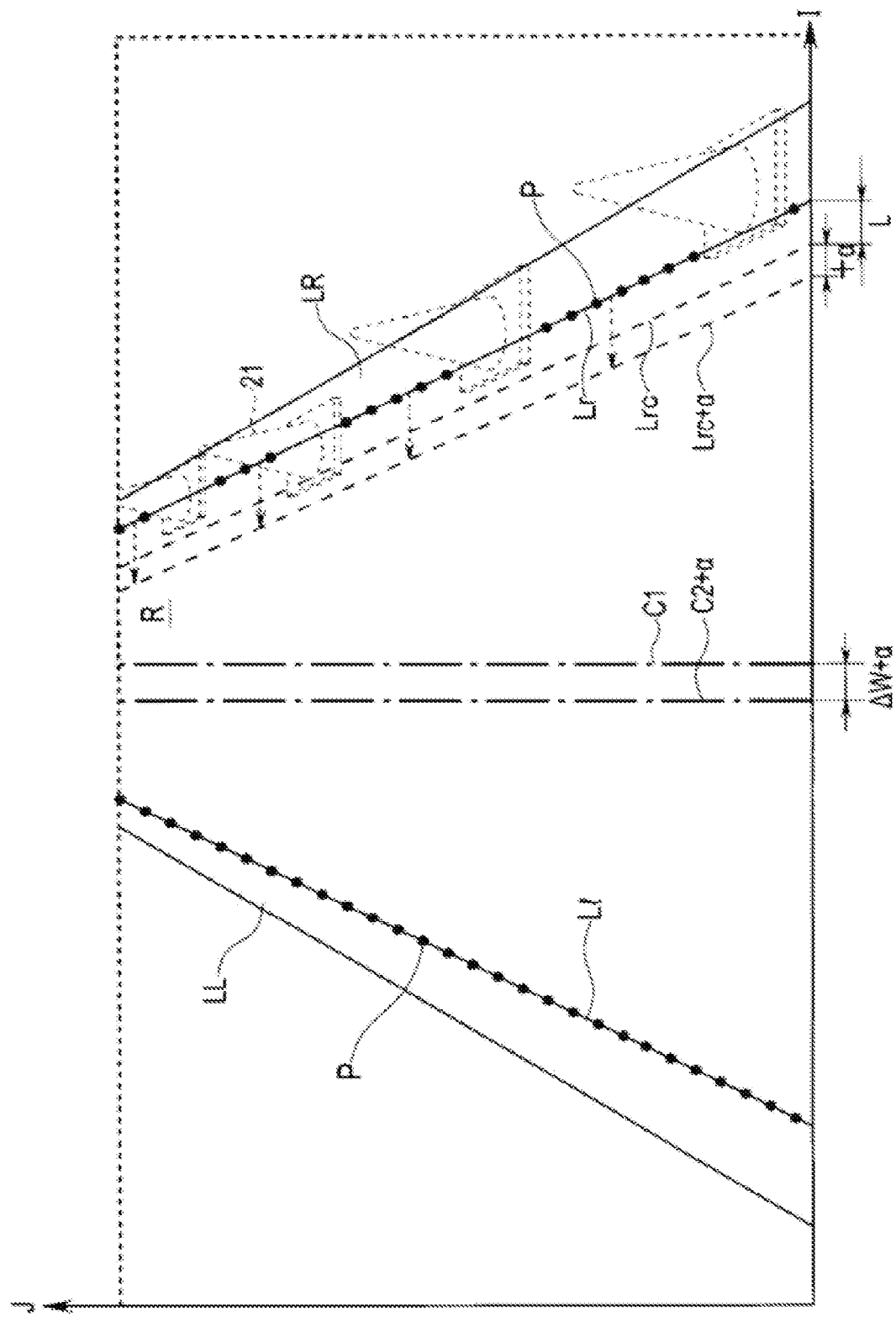
FIG. 19 is an explanatory diagram schematically illustrating an example in which the target travel course is changed by correcting the lateral position of an approximate line of the lane dividing line on which some traffic cones are placed protruding from the lane dividing line.
Figure 20:
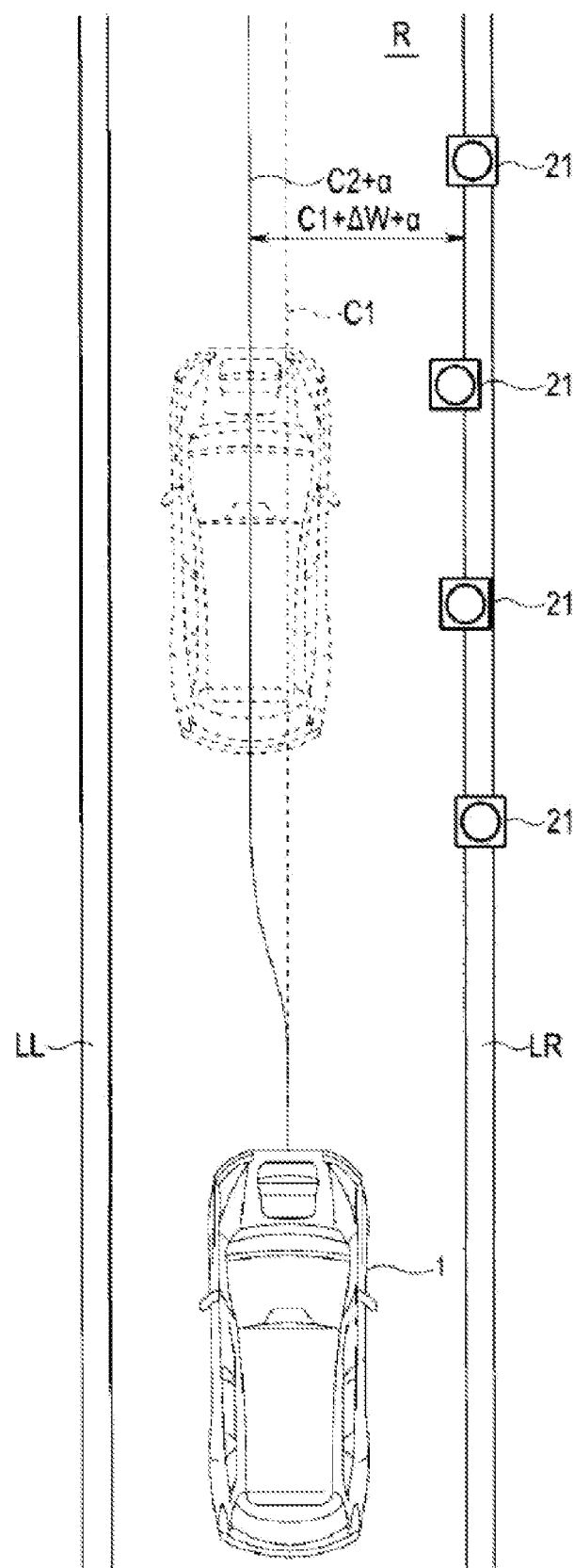
FIG. 20 is an explanatory diagram schematically illustrating an exemplary traveling state of the vehicle observed when the target travel course is changed as in FIG. 19.

In the examples illustrated in FIGS. 15 and 19, for example, some of the traffic cones 21 serving as the static 3D objects are placed protruding from the right lane dividing line LR toward the own-vehicle travel lane R. In this example, the processor 5 may calculate a detection distance α, which is the amount of protrusion of the static 3D object or the traffic cone 21 protruding the most toward the own-vehicle travel lane R from the right approximate line Lr of the right lane dividing line LR.

In Step S22, the processor 5 may determine a second correction amount L+α by adding the calculated detection distance (the amount of protrusion) α to the first predetermined correction amount L set on the basis of the vehicle speed of the own vehicle 1 and the distance from the approximate line Ll or Lr to the own vehicle 1, for example.

In Step S23, the processor 5 may correct the lateral position of the approximate line Ll or Lr by adding the second correction amount L+α. For example, the processor 5 may change the approximate line Ll or Lr (e.g., the right approximate line Lr in the example illustrated in FIG. 19) to a virtual approximate line (e.g., a virtual approximate line Lrc+α in the example illustrated in FIG. 19) by shifting the approximate line Ll or Lr toward the middle of the own-vehicle travel lane R in the lateral direction by the second correction amount L+α. The processor 5 may then determine in Step S19 whether the conditions for ALKC are satisfied.

If the conditions for ALKC are satisfied (Step S19: YES), the processor 5 may change the target travel course in Step S20 and cause the process to exit the routine and return to Step S11. In the example illustrated in FIG. 18, the processor 5 may change the target travel course C1 set in the middle between the approximate lines Ll and Lr before the correction to a target travel course C2+α set in the middle between the approximate lines Ll and Lr after the correction to execute the ALKC control.

When the distance between the approximate lines Ll and Lr is shortened as described above, the target travel course C2+α may be determined by shifting the target travel course C1 originally set in the lateral direction by a predetermined distance ΔW+α. The processor 5 may perform the ALKC control of the own vehicle 1 along the target travel course C2.

If the conditions for ALKC are not satisfied (Step S19: NO), the processor 5 may cancel the ALKC control (Step S24). Although the traffic cones 21 are placed on the right lane dividing line LR in the examples described above, the same control may be executed even when the poles 22, the construction signboards 23, or the like are detected. In a case where these static 3D objects are placed on the left lane dividing line LL, the target travel course may be shifted to the right.

As described above, even when the own vehicle 1 passes through the area in which the static 3D objects, such as the traffic cones 21, the poles 22, and the construction signboards 23, are placed on or near the lane dividing line LL or LR of the own-vehicle travel lane R while the ALKC control, which is one of the touring assist functions of the own vehicle 1, is executed, the processor 5 of the drive assist apparatus 2 in the own vehicle 1 controls the lateral position of the own vehicle 1 to cause the own vehicle 1 to travel distant from the static 3D objects. This helps prevent the driver from feeling scared while the driver is driving the own vehicle 1.

Further, even in a case where the static 3D objects are placed protruding from the lane dividing line LL or LR toward the own-vehicle travel lane R on which the own vehicle 1 is traveling, the processor 5 controls the own vehicle 1 so that the own vehicle 1 travels along the target travel course C2+α set on the basis of the detection distance α, which is the amount of protrusion. This helps prevent the driver from feeling scared. Note that the processor 5 may recognize the traffic cones 21, the poles 22, and the construction signboards 23 that are placed within a predetermined region covering a region outside the lane dividing line LL or LR as the static 3D objects. For example, the predetermined region may include a region of another lane or a region about 50 centimeters outside the lane dividing line LL or LR.

If the conditions for ALKC are not satisfied in the area in which the static 3D objects are placed on or near the lane dividing line LL or LR, the processor 5 may cancel the ALKC control. This helps prevent the own vehicle 1 from coming too close to a sidewalk, a road edge, a road shoulder, or the like.

During the ALKC control, the target travel course is corrected or changed on the basis of the detection of the static 3D objects, such as the traffic cones 21, the poles 22, and the construction signboards 23, as described above. Additionally, in a case where static 3D objects, such as sidewalls, road edges, and road shoulders, that are located far from the own vehicle 1 are detectable in advance from map data during the ALKC control, the own vehicle 1 may be controlled to travel distant from the static 3D objects. For example, in a case where the data on the static 3D objects, such as the traffic cones 21, the pole 22, the construction signboard 23, sidewalls, road edges, and road shoulders, are detectable in advance from the map data, the virtual approximate line (e.g., the virtual approximate line Lrc or Lrc+α) may be set by performing a predetermined correction of the lateral position of the approximate line of the lane dividing line LL or LR on the basis of the data on the static 3D objects without performing the exemplary control illustrated in the flowchart of FIG. 16 in order to change the target travel course.

The stereo image recognizer 4 and the processor 5 in the drive assist apparatus 2 of the own vehicle 1 may each include a processor including a memory such as a central processing unit (CPU), a read-only memory (ROM), or a random-access memory (RAM). Some or all of the circuits of the processor may be implemented by software. For example, various programs corresponding to various functions stored in the ROM may be read and implemented by the CPU.

Alternatively, some or all of the functions of the processor may be implemented by logic circuitry or analog circuitry. Additionally, various programs may be implemented by electronic circuitry such as FPGA.

At least one of the stereo image recognizer 4 and the processor 5 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the stereo image recognizer 4 and the processor 5. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the stereo image recognizer 4 and the processor 5 illustrated in FIG. 1.

The technology described above is not limited to the foregoing example embodiments, and various modifications may be made in the implementation stage without departing from the gist of the technology. Further, the foregoing example embodiments each include various stages of the technology, and various technologies may be extracted by appropriately combining the features of the technology disclosed herein.

For example, in a case where the above-described concerns may be addressed and the above-described effects may be obtained even if some features are deleted from all the features disclosed herein, the remaining features may be extracted as a technology.

The invention claimed is:

1. A vehicle drive assist apparatus comprising:
a stereo camera to be installed on a vehicle and configured to acquire image data on a traveling environment in front of the vehicle; and
at least one machine readable medium storing instructions and at least one processor configured to execute the instructions to:
recognize sides of dividing lines defining a travel lane as two approximate lines on a basis of the image data on the traveling environment acquired by the stereo camera, the sides of the dividing lines being adjacent to the travel lane, the two approximate lines being each in a linear form, and
set a target travel course in a middle between the two approximate lines and control a steering mechanism of the vehicle to cause the vehicle to travel along the target travel course, wherein,
when a static three-dimensional object has been continuously detected on or near one of the dividing lines on a basis of the image data on the traveling environment, the at least one processor is configured to set a virtual approximate line by correcting a lateral position of the approximate line of the one of the dividing lines on which the static three-dimensional object is placed in a direction apart from the static three-dimensional object toward a middle of the travel lane by a predetermined correction amount, and set the target travel course in a middle between the virtual approximate line and the approximate line of the other of the dividing lines, and
in a case where the static three-dimensional object has been detected in advance on a basis of map data, the at least one processor is configured to execute instructions to correct the lateral position of the approximate line of the one of the dividing lines on a basis of the map data.

2. A vehicle drive assist apparatus comprising:
a stereo camera to be installed on a vehicle and configured to acquire image data on a traveling environment in front of the vehicle; and
at least one machine readable medium storing instructions and at least one processor configured to execute the instructions to:
recognize sides of dividing lines defining a travel lane as two approximate lines on a basis of the image data on the traveling environment acquired by the stereo camera, the sides of the dividing lines being adjacent to the travel lane, the two approximate lines being each in a linear form, and
set a target travel course in a middle between the two approximate lines and control a steering mechanism of the vehicle to cause the vehicle to travel along the target travel course, wherein,
when a static three-dimensional object has been continuously detected on or near one of the dividing lines on a basis of the image data on the traveling environment, the at least one processor is configured to set a virtual approximate line by correcting a lateral position of the approximate line of the one of the dividing lines on which the static three-dimensional object is placed in a direction apart from the static three-dimensional object toward a middle of the travel lane by a predetermined correction amount, and set the target travel course in a middle between the virtual approximate line and the approximate line of the other of the dividing lines, wherein
the at least one processor is further configured to execute instructions to:
construct a grid map in a predetermined region in front of the vehicle,
cast a vote for a grid area of the grid map corresponding to the static three-dimensional object having been detected,
detect whether the grid area for which the vote is casted protrudes from the one of the dividing lines toward the travel lane, and
variably change the predetermined correction amount of the lateral position of the approximate line of the one of the dividing lines.

3. A vehicle drive assist apparatus comprising:
a stereo camera to be installed on a vehicle and configured to acquire image data on a traveling environment in front of the vehicle; and
circuitry configured to
recognize sides of dividing lines defining a travel lane as two approximate lines on a basis of the image data on the traveling environment acquired by the stereo camera, the sides of the dividing lines being adjacent to the travel lane, the two approximate lines being each in a linear form, and
set a target travel course in a middle between the two approximate lines and control a steering mechanism of the vehicle to cause the vehicle to travel along the target travel course, wherein,
when a static three-dimensional object has been detected on or near one of the dividing lines on a basis of the image data on the traveling environment, the circuitry is configured to set a virtual approximate line by correcting a lateral position of the approximate line of the one of the dividing lines on which the static three-dimensional object is placed in a direction apart from the static three-dimensional object toward a middle of the travel lane by a predetermined correction amount, and set the target travel course in a middle between the virtual approximate line and the approximate line of the other of the dividing lines, and
in a case where the static three-dimensional object has been detected in advance on a basis of map data, the circuitry is configured to correct the lateral position of the approximate line of the one of the dividing lines on a basis of the map data.

4. A vehicle drive assist apparatus comprising:
a stereo camera to be installed on a vehicle and configured to acquire image data on a traveling environment in front of the vehicle; and
circuitry configured to
recognize sides of dividing lines defining a travel lane as two approximate lines on a basis of the image data on the traveling environment acquired by the stereo camera, the sides of the dividing lines being adjacent to the travel lane, the two approximate lines being each in a linear form, and
set a target travel course in a middle between the two approximate lines and control a steering mechanism of the vehicle to cause the vehicle to travel along the target travel course, wherein, when a static three-dimensional object has been detected on or near one of the dividing lines on a basis of the image data on the traveling environment, the circuitry is configured to set a virtual approximate line by correcting a lateral position of the approximate line of the one of the dividing lines on which the static three-dimensional object is placed in a direction apart from the static three-dimensional object toward a middle of the travel lane by a predetermined correction amount, and set the target travel course in a middle between the virtual approximate line and the approximate line of the other of the dividing lines, and wherein the circuitry is further configured to
- cast a vote for a grid area of the grid map corresponding to the static three-dimensional object having been detected,
- detect whether the grid area for which the vote is casted protrudes from the one of the dividing lines toward the travel lane, and
- variably change the predetermined correction amount of the lateral position of the approximate line of the one of the dividing lines.

\* \* \* \* \*